Figure 1:
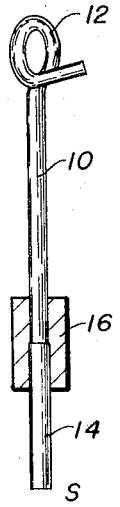
Figure 2:
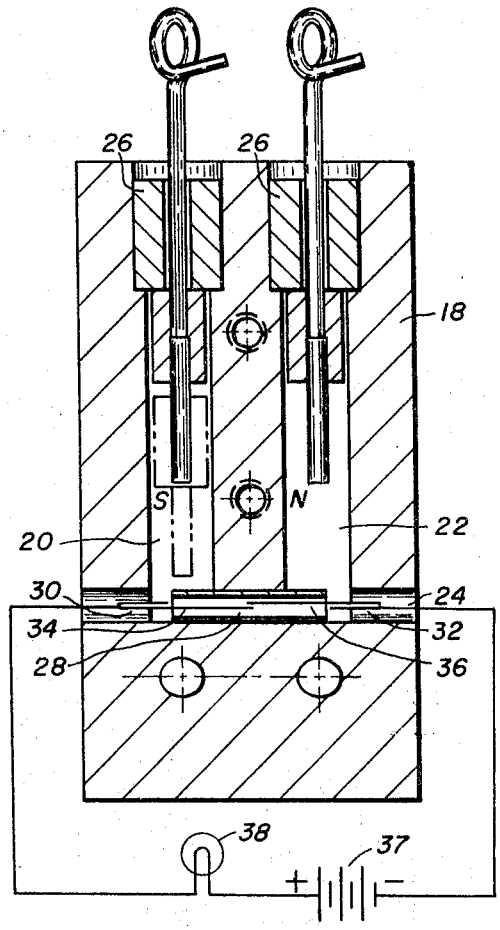

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 9

T932,003
YARN BREAK DETECTOR
Thomas J. Strawser, Frostburg, Md.
(% Celanese Fibers Co., Box 444, Cumberland, Md.)
Continuation of application Ser. No. 151,409, June 9, 1971. This application Nov. 30, 1973, Ser. No. 420,415
Int. Cl. G08b *21/00*
U.S. Cl. 340—259
1 Sheet Drawing. 9 Pages Specification

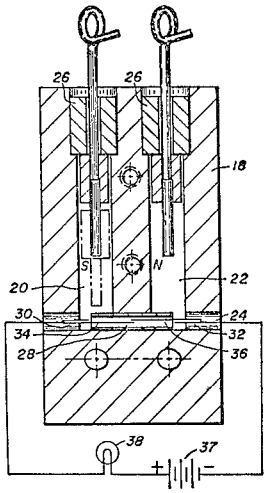

A yarn break detector suitable for yarns having tensions down to 0.1 gram and comprising a body provided with a passageway, a pin extending into said passageway so as to be movable longitudinally therein from a withdrawn position to a forward position, said pin being provided with a yarn guiding surface, a magnet connected to the end of said pin within said passageway so as to be movable therewith, a magnetically actuated switch positioned within said body at a location adjacent the magnet when said pin is in one of said withdrawn or forward positions, and an electrically actuated indicator whose circuit is opened or closed by said magnetically actuated switch, whereby when a yarn runs over the guide surface of said pin the tension in said yarn holds said pin and magnet in one of said two positions and the magnetic switch and indicator are in predetermined operating conditions, and upon a break in the yarn the release to their second positions, the magnetic switch and thus the indicator change their operating conditions so as to give an indication of the yarn break.

March 4, 1975 T. J. STRAWSER T932,003

YARN BREAK DETECTOR

Original Filed June 9, 1971

INVENTOR

THOMAS J. STRAWSER